United States Patent [19]
Presby

[11] Patent Number: 5,892,863
[45] Date of Patent: *Apr. 6, 1999

[54] SILICA OPTICAL CIRCUIT SWITCH AND METHOD

[75] Inventor: Herman Melvin Presby, Highland Park, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 733,538

[22] Filed: Oct. 18, 1996

Related U.S. Application Data

[63] Continuation of Ser. No. 445,851, May 22, 1995, abandoned.

[51] Int. Cl.[6] .................................................... G02B 6/10
[52] U.S. Cl. .................................. 385/16; 385/21; 385/5
[58] Field of Search ................................. 385/16, 5, 21, 385/22

[56] References Cited

U.S. PATENT DOCUMENTS

| | | | |
|---|---|---|---|
| 5,173,956 | 12/1992 | Hayes | 385/16 |
| 5,224,185 | 6/1993 | Ito et al. | 385/16 |
| 5,315,422 | 5/1994 | Utaka et al. | 385/5 |
| 5,432,873 | 7/1995 | Hosoya et al. | 385/21 |

OTHER PUBLICATIONS

C. H. Henry et al., "Glass Waveguides on Silicon for Hybrid Optical Packaging," *Journal of Lightwave Technology*, vol. 7, pp. 1530–1539 (1989), (Oct.).

M. Kawachi, "Silica Waveguides on Silicon and Their application to integrated–optic components,"*Optical and Quantum Electronics*, vol. 22, pp. 391–416 (1990), (No month available).

M. Haruna et al., Thermoptic Deflection and Switch in Glass, *Applied Optics*, vol. 21, pp. 3461–3465 (Oct. 1994).

B. H. Verbeck et al., "Integrated Four–Channel Mach–Zehnder Multi/Demultiplexer Fabricated with Phosphorous Doped $SiO_2$ Waveguides on Si," *Journal of Lightwave Technology*, vol. 6, No. 6, pp. 1011–1015 (1988), (Jun.).

Lee et al., "2×2 Single–Mode Zero–Gap Direction–Coupler Thermo–Optic Waveguide Switch on Glass," *Applied Optics*, vol. 33, No. 30, pp. 7016–7022 (Oct. 1994).

R. März, *Integrated Optics: Design and Modeling*, Chap. 6, pp. 205–209, (Artech House, Inc. 1955), (No month available).

Primary Examiner—Rodney B. Bovernick
Assistant Examiner—Yisun Song
Attorney, Agent, or Firm—Robert E. Rudnick; Martin I. Finston

[57] ABSTRACT

A thermally activated silica optical circuit switch that uses light from a light source, such as a laser, to heat various regions of the switch to produce a switching function. In one embodiment, the switch includes silica glass formed on a substrate, such as a silicon substrate, and at least one input waveguide and one output waveguide formed within the silica glass. A light source is then used to generate light that illuminates a path in the silica glass that couples a particular input waveguide to a particular output waveguide. The light from the light source has a wavelength that enables it to be substantially absorbed by the silica glass and substantially transmitted through the substrate. The illumination by the light increases the temperature and correspondingly the index of refraction of the silica glass in the path. A light signal is then able to travel through the coupled waveguides via the increased index of refraction of the silica glass within the path. In another embodiment, components of the switch are formed within the silica glass with at least one of the switch components being a thermally activated component to provide a switching function. Light from a light source illuminates the silica glass in a region of the thermally activated component to heat the component and cause the performance of the switching function.

12 Claims, 2 Drawing Sheets

SILICA OPTICAL CIRCUIT SWITCH AND METHOD

This application is a continuation of application Ser. No. 08/445,851, filed May 22, 1995 now abandoned.

FIELD OF THE INVENTION

This invention relates to silica optical circuits and more particularly to compact, energy efficient thermally activated silica optical circuit switches.

BACKGROUND OF THE INVENTION

Integrated optical devices for directly processing optical signals have become increasingly important as optical fiber communications increasingly replace metal cable and microwave transmission links. Integrated optical devices can be implemented as silica optical circuits which employ integrated glass waveguide structures formed on silicon substrates. The basic structure of such devices is described in C. H. Henry et al., "Glass Waveguides on Silicon for Hybrid Optical Packaging", 7 *J. Lightwave Technol.*, pp. 1530–1539 (1989) (Henry et al. reference), which is herein incorporated by reference.

Typically, in silica optical circuits, a silicon substrate is provided with a base layer of $SiO_2$, and a thin core layer of doped silica glass is deposited on the $SiO_2$ layer. The core layer can be configured to a desired waveguide structure using standard photolithographic techniques. Then, a layer of doped silica glass is deposited over the core layer to act as a top cladding. Waveguides formed in silica optical circuits have been configured to provide optical switching.

A known thermo-optic single mode switch configuration is described in M. Kawachi, "Silica Waveguides on Silicon and Their application to integrated-optic components", 22 *Optical and Quantum Electronics*, pp. 391–416 (1990) (Kawachi reference), which is incorporated by reference herein. This optical switch uses a Mach-Zehnder interferometer configuration and includes first and second directional couplers and two equal-length single-mode waveguide arms buried within silica glass. Each coupler has a pair of inputs and a pair of outputs. The two waveguide arms connect the outputs of the first coupler to the respective inputs of the second coupler. Thin chromium heater strips are deposited on the surface of the top cladding above the waveguide arms.

In operation, when no electricity is applied to either of the heater strips, a light signal at one of the inputs of the first coupler is split such that a portion of the signal is transmitted through each waveguide arm to the second coupler. The second coupler recombines the light signal portions and directs the recombined light signal to a particular output of that coupler. When electricity is applied to one of the heater strips, the heater strip heats the corresponding waveguide arm which increases its index of refraction and correspondingly the effective length of the light path through that waveguide arm. The increase in the effective length of the light path produces a phase difference between the light signals at the end of that waveguide arm and the end of the unheated waveguide arm. When the phase difference is $\pi$ radians, destructive interference occurs in the second coupler and the routing of the recombined light signal is switched to the other output of the second coupler.

Other known types of thermo-optic switches that rely on heater strips to perform the switching function are disclosed in M. Haruna et al., "Thermoptic Deflection and Switching in Glass", *Appl. Opt.*, Vol. 21, pp. 3461–65 (October 1994) (Haruna reference), which is incorporated by reference herein.

The packing density of these known switch configurations is limited due to the area required for the heater strip contact electrodes. The heater contacts provide a soldering or bonding pad for connection to electrical wires from heater drive circuits. Moreover, such switches cannot be positioned too close to one another because the heat generated by a particular heater strip can undesirably effect the index of refraction of a waveguide of an adjacently positioned switch. As a consequence, a multiple port (M×N) switch configuration having a large number of individual or cascaded conventional switches requires a relatively large portion of an integrated circuit chip and has a relatively high wiring complexity. In addition, each of the corresponding chromium heater strips requires power on the order of 0.5 W to switch light paths which can result in a high power requirement for cascaded multiple port switches.

Thus, there is a recognized need for relatively low cost silica optical circuit switch that can be implemented in compact dimensions without the need for strip heaters or heater electrodes.

SUMMARY OF THE INVENTION

A thermally activated silica optical circuit switch uses light from a light source, such as a laser, to heat various regions of the switch to produce a switching function. In one embodiment, the switch includes silica glass formed on a substrate, such as a silicon substrate, and at least one input waveguide and at least one output waveguide formed within the silica glass. The laser is then used to generate light that illuminates a path in the silica glass, such as by scanning, to couple an input waveguide to an output waveguide. The light generated by the laser has a wavelength that enables it to be substantially absorbed by the silica glass and substantially transmitted through the substrate. The illumination of a path in the silica glass increases the temperature and correspondingly changes the index of refraction of the silica glass in the path. A light signal is able to travel through the coupled waveguides via the changed index of refraction of the silica glass within the heated path.

In another embodiment, components of the switch are formed within the silica glass with at least one of the switch components being thermally activated to perform a switching function. One suitable switch configuration for the components is, for example, a conventional Mach-Zehnder interferometer switch configuration that includes two equal length waveguide arms connecting two couplers. Such a switch configuration can produce a 1×1, 1×2 or 2×2 switch arrangement. Light from a light source illuminates the silica glass in a region of the thermally activated component to heat the component to produce the switching function.

Since the light is substantially transmitted through the substrate it can be directed at a surface of the silica glass or a surface of the substrate to increase the temperature of a particular region of the silica glass. The present invention further enables the use of a single laser to produce a change in temperature and provide switching for a single switch or a group of circuit switches located on the same integrated circuit chip or closely positioned chips without the need for the complex wire connections of individual heater electrodes and heater strips. Moreover, it is possible to position such thermally activated switches closer to one another as the physical limitations of the heater strip arrangements are removed.

Additional features and advantages of the present invention will become more readily apparent from the following detailed description and accompanying drawings.

DETAILED DESCRIPTION

The present invention is based on the discovery that a particular range of wavelengths of light exists that is absorbed by silica glass and that is transmitted through various substrate materials, such as silicon. When absorbed by the silica glass, the energy of such light is dissipated as heat. Accordingly, it is possible to employ a light source, such as a laser, to generate light having the appropriate wavelength as a heating means for a thermally activated switch instead of the heater strips of conventional thermo-optic switches. Moreover, since such light is transmitted through the substrate, it is possible to direct the light to illuminate the circuit through the substrate side or through a top layer silica side. By illuminating a region of the silica glass with light, the present invention is able to heat that region without the need for conventional heater strips or their drive circuit wire connections. Thus, for example, a conventional 1×64 switch can require over 100 heater electrodes and electrical drive circuit connections while a corresponding 1×64 switch according to the present invention requires no heater strips or drive circuit connections.

Figure 1:
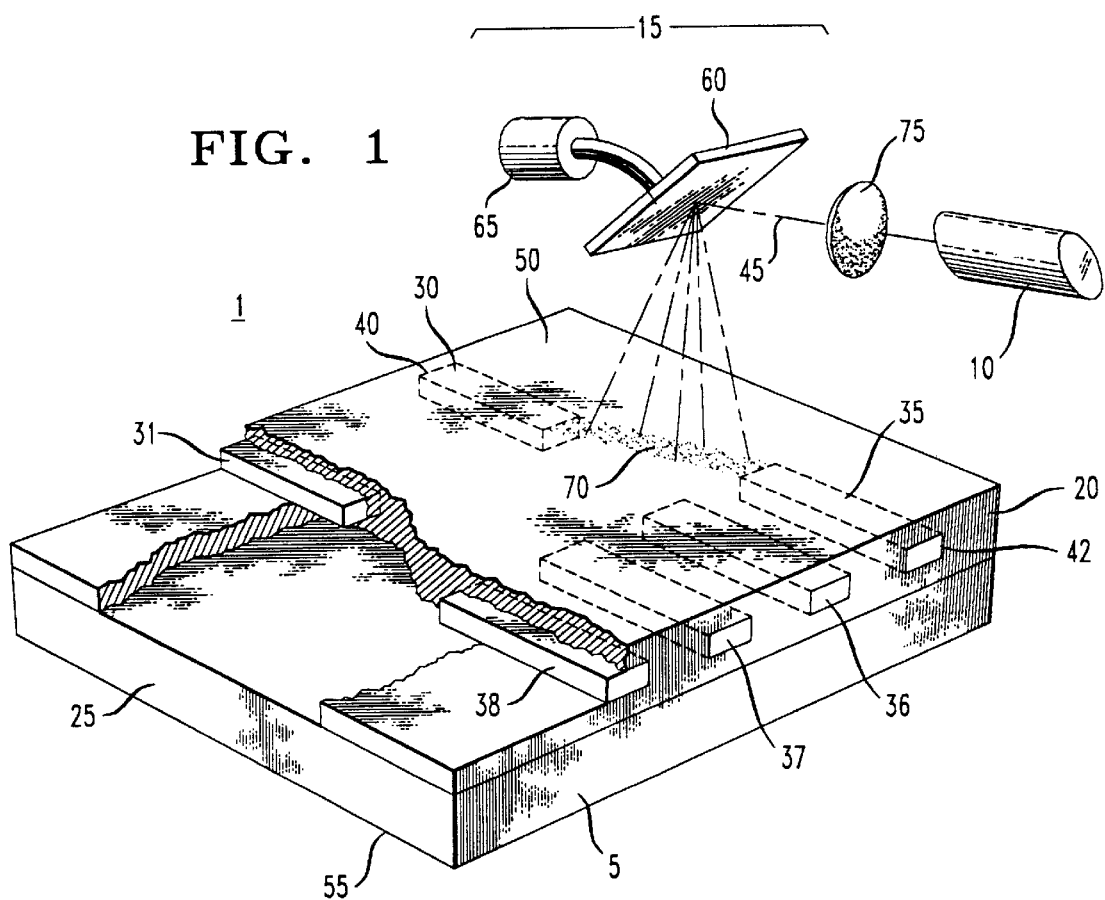
FIG. 1 is a perspective partial cut-away view of an exemplary 2×4 silica optical circuit switch with thermally induced waveguides in accordance with the present invention.

An exemplary silica optical circuit switch 1 in accordance with the present invention is illustrated in FIG. 1. The switch 1 includes a silica optical structure 5, a light source 10, such as a laser, and a light directing apparatus, such as a mirror structure 15. The silica optical structure 5 has silica ($SiO_2$) glass 20 formed on a substrate 25, such as a silicon substrate. The substrate 25, such as a wafer of (100) silicon having a thickness, for example, on the order of 0.5 mm, provides a foundation upon which a waveguide structure can be formed. While the proceeding description relates to silica on silicon waveguide devices, it should be understood that it is possible to fabricate the circuit on other substrate materials such as fused quartz, lithium niobate or ceramic.

Input waveguides 30 and 31, and output waveguides 35, 36, 37 and 38 are formed within the silica glass 20 of the silica optical structure 5. Conventional fabrication techniques, such as lithography, etching, low pressure vapor chemical deposition, and flame hydrolysis, are useful in fabricating the waveguides 30, 31 and 35–38. An exemplary fabrication process for the silica optical circuit 5 is as follows: a base layer of silica glass is deposited on the substrate 25, and a thin core layer of doped silica glass is deposited on this silica glass layer; the core layer is then configured to the desired waveguide structures 30, 31 and 35–38 using standard photolithographic techniques; and a layer of doped silica glass is then deposited over the core layer to act as a top cladding. A suitable doping profile for the doped silica is glass is uniform step-index distribution.

The silica glass top cladding and the base layer of silica glass form the silica glass 20 shown in FIG. 1. Suitable thicknesses for the base silica layer, core layer and top cladding layer are 10 to 20 $\mu$m, 4 to 8 $\mu$m and 10 to 20 $\mu$m, respectively. Thicknesses less than 10 $\mu$m for the base silica layer are undesirable because of light loss to the substrate while thickness greater than 20 $\mu$m are generally disadvantageous because of long deposition times required to form such thicknesses. For a detailed discussion of glass waveguides on silicon and the fabrication thereof, see, for example, the above cited Henry et al. reference, and B. H. Verbeek et al., "Integrated Four-Channel Mach-Zehnder Multi/Demultiplexer Fabricated with Phosphorous Doped $SiO_2$ Waveguides on Si," *J. of Lightwave Technol.*, Vol. 6, No. 6, pp. 1011–15 (1988), which are incorporated by reference herein. Although the above exemplary fabrication method produces waveguides within the silica glass 20 that are completely buried, it is possible to fabricate such waveguides within the silica glass 20 near a silica glass top surface 50 or which are only partially buried.

In operation, it is possible to couple either input waveguide 30 or 31 to one of the output waveguides 35–38 by forming a temporary waveguide in the silica glass 20 between the waveguides to be coupled. It is further possible to induce a temporary waveguide between the input waveguide 30 and the output waveguide 35 by heating a particular region of the silica glass 20 that corresponds to a path between the waveguides 30 and 35. The heating of the particular region of silica glass increases the index of refraction of the silica glass in that region relative to the surrounding regions and permits a light signal to travel through that region. In this manner, a light signal is able to travel from an input end 40 of the input waveguide 30 to an output end 42 of the output waveguide 35.

Silica glass has an index of refraction of approximately 1.450 for a wavelength of approximately 1 $\mu$m at 0° C. which increases to approximately 1.451 when heated to 100° C. The temperature coefficient of the refractive index ($\Delta n/\Delta t$) is approximately $1.0 \times 10^{31\ 5}/°C$. over the temperature range of −200° C. to 500° C. A detailed description of one type of thermally induced waveguides using chromium heater strips is described in U.S. patent application Ser. No. 08/444,949, entitled "NETWORK WITH THERMALLY INDUCED WAVEGUIDE," filed May 19, 1995 now U.S. Pat. No. 5,623,566, in the name of H. J. Lee and W. Wang, which is assigned to the assignee of the present invention and which is incorporated by reference herein.

In accordance with the present invention, the light source 10 is used to provide light, such as a continuous beam of light 45, having a wavelength that enables it to be substantially absorbed by the silica glass 20 and substantially transmitted through the substrate 25. For example, lasers or LEDs that emit light having a wavelength in the range of 5 to 12 $\mu$m can be used for the light source 10 if the substrate 25 is a silicon substrate. Such light would be substantially transmitted through the silicon substrate 25 and be substantially absorbed by the silica glass 20. Typically, 75% of such light is transmitted through the substrate 25 and 100% is absorbed by the silicon glass 20. A suitable light source 10 to provide such a beam of light is, for example, a $CO_2$ laser. A suitable power for the laser 10 is on the order of 25 W.

A $CO_2$ laser 10 generating a continuous beam of light having a wavelength of 10.6 $\mu$m would be absorbed in approximately 1 $\mu$m of the silica glass 20. The region below the initial 1 $\mu$m of the silica glass 20 is heated by conduction from the heat generated during the absorption of light energy within the initial 1 $\mu$m of the silica glass 20. The particular type of light source used for the light source 10 is not critical beyond the requirement that the generated light has the appropriate wavelength and power. Other suitable light sources include, for example, a semiconductor quantum cascade laser or a solid state lead-salt laser for the laser 10.

The beam of light 45 emitted by the laser 10 is directed at the mirror structure 15 which redirects the beam of light 45 onto the silica optical structure 5. In FIG. 1, the mirror structure 15 redirects the beam of light 45 to be incident on the top surface 50 of the silica glass 20. In the alternative, it is possible to redirect the beam of light 45 to be incident on a bottom surface 55 of the substrate 25, since the light will be substantially transmitted through the substrate 25 to the silica glass 20.

The mirror structure 15 includes at least one moveable mirror 60 and a mirror positioning unit 65, such as a conventional scanning mirror arrangement. The mirror structure 15 operates to redirect the beam of light 45 to repeatedly scan the desired path of the temporary waveguide to be formed in the silica glass 20. The depiction of the single mirror 60 within the mirror structure 15 is for illustration purposes only and it is possible to employ any number of mirrors in accordance with the present invention. The use of at least two mirrors enables waveguides to be induced that have curved shapes. Although a mirror structure is employed to direct the beam of light 45 in the embodiment shown in FIG. 1, the particular method and apparatus employed to illuminate either the silica glass surface 50 or the substrate surface 55 is not critical in practicing the present invention. Other suitable methods of illumination include the use of prisms, beam splitter lenses or waveguiding structure suitable for the light wavelength employed.

An optional cylindrical lens 75 is positioned in the path of the beam of light 45 to focus the size of the beam of light 45. An exemplary illumination or scanning region of the silica glass surface 50 to establish a temporary waveguide between waveguides 30 and 35 is represented by a shaded region 70. The scanning rate and power of the light source 10 should be selected to provide adequate heating of the scanned silica glass region to provide a sufficient increase in the index of refraction to produce the temporary waveguide. A focused beam providing 0.5 W of power will raise the index of the temperature by 100° C., thereby raising the index of refraction by $1.0 \times 10^{-3}$ to form an induced waveguide.

An advantage of the present invention over known silica optical switches is the use of a single heating means, the light source 10 and the light directing apparatus 15, to provide the necessary heating to cause switching in a single thermally activated switch or a group of switches located on the same integrated circuit chip or closely positioned chips. The present invention is able to use this single light source to heat the silica glass without the need for heater strips or their complex wire connections to individual heater electrodes. It should be understood that it is further possible to use multiple light sources in accordance with the present invention without departing from the teaching thereof.

The relative spacing between the respective input waveguides 30 and 31, and the output waveguides 35–38 have been shown in FIG. 1 for ease of illustration purposes. In order to enhance the amount of a light signal that enters one of the output waveguides 35–38 from an induced temporary waveguide, it is preferable that the output waveguides 35–38 be positioned as close together as possible, and substantially near the axes of the input waveguides 30 and 31. Likewise, the input waveguides 30 and 31 should also be positioned as close together as possible. In this manner, a light signal traveling through either of the input waveguides 30 or 31 does not have to detour far from the axis of its travel to enter one of the output waveguides 35–38. A suitable and convenient relative spacing is the standard spacing of 250 μm used in conventional external waveguide fiber connectors. The induced waveguides can have a straight or curved shape based on the shape of the region scanned by the beam of light 45.

Figure 2:
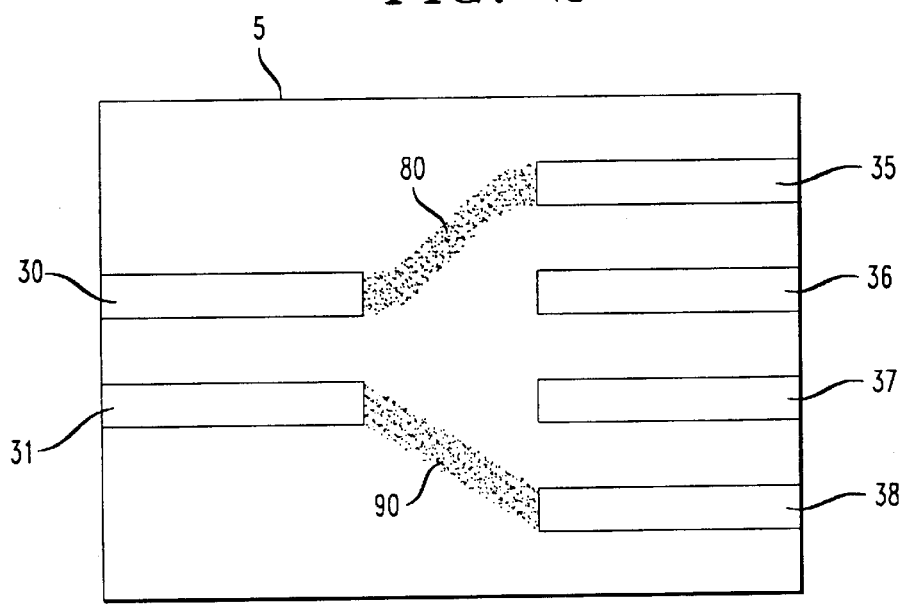
FIG. 2 is a top view of the circuit shown in FIG. 1.

A top view of the optical circuit structure 5 is shown in FIG. 2. In FIG. 2, two different shaped illumination regions are represented by shaded regions 80 and 90. The illumination region 90 creates a substantially straight temporary waveguide from the input waveguide 31 to the output waveguide 38. A curved illumination region, such as the region 80 between waveguides 30 and 35, would produce a corresponding curved induced temporary waveguide through the silica glass 25. Such curved temporary waveguides reduces the amount of light that strays into one of the adjacent output waveguides to the waveguide 35 and thereby reduces crosstalk between the output waveguides 35–38. This reduction in crosstalk occurs because the induced waveguide curve causes the output waveguides adjacent to the waveguide 35 to not be in line or nearly in line with the transmitting input waveguide.

Figure 3:
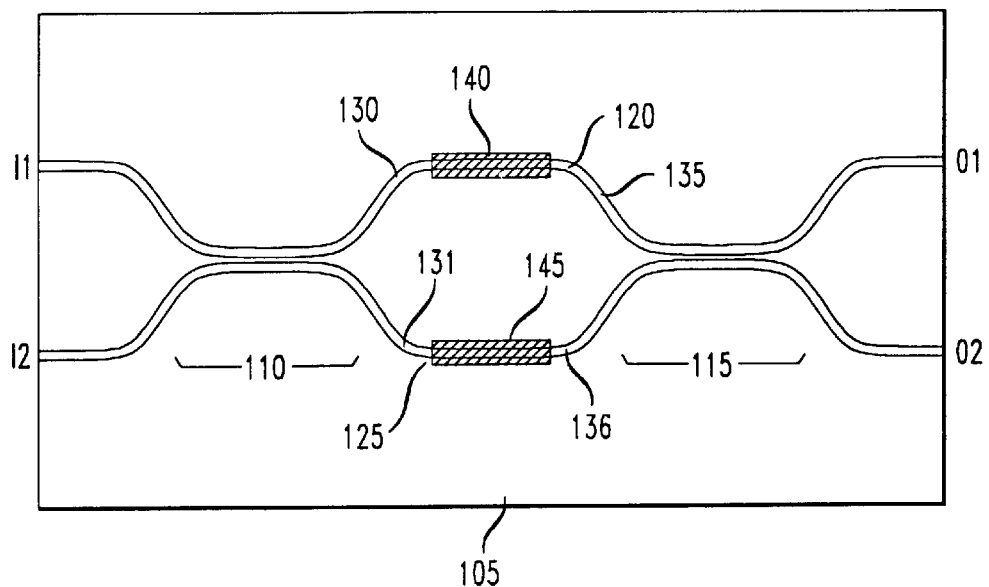
FIG. 3 is a top view of an exemplary optical circuit switch in accordance with the present invention that employs thermally activated switch components within the silica glass.

FIG. 3 is a top view of an exemplary 2×2 switch 100 having a Mach-Zehnder configuration in accordance with the present invention. The switch 100 employs waveguides formed within silica glass as the thermally activated circuit component instead of the induced temporary waveguides of the silica optical structure 5 of FIG. 1. It is possible to fabricate the switch 100 in a substantially identical manner to the silica optical structure 5 described above with regard to FIG. 1. In FIG. 3, a layer of silica glass 105 is formed on top of a substrate, such as the substrate 25 shown in FIG. 1. Two directional couplers 110 and 115 and two equal-length single-mode waveguide arms 120 and 125 are formed within the silica glass 105. Each of the couplers 110 and 115 has respective inputs I1 and I2, and 135 and 136, and respective outputs 130 and 131, and O1 and O2. The waveguide arms 120 and 125 connect the outputs 130 and 131 of the coupler 110 to the corresponding inputs 135 and 136 of the coupler 115, respectively.

In accordance with the present invention, the switching function of the switch 100 is achieved by heating either waveguide arm 120 or 125 by illuminating the silica glass 105 with light having the appropriate wavelength, such as by scanning with a beam of light generated by the light source 10 shown in FIG. 1. Exemplary illumination or scanning regions for the beam of light to heat either of the waveguide arms 120 and 125 are represented by shaded regions 140 and 145, respectively.

It is possible to configure the switch 100 such that a light signal at the waveguide input I1 is directed to the corresponding output O2 when neither waveguide arm 120 and 15 is heated by a beam of light. When a beam of light is directed at either of the illumination regions 140 and 145, the corresponding waveguide arm 120 or 125 is heated producing a change in its index of refraction and a corresponding change in the effective length of the light path for a light signal within that waveguide. Since the waveguides arms 120 and 125 are of equal length, the change in the effective length of the light path in one of the waveguides produces a phase difference between the light signals at the ends of that waveguide and the unheated waveguides. When the phase difference is π radians, destructive interference occurs at the coupler 115 and the routing of the light signal is switched from the output O2 to the output O1. In an identical manner, a light signal at the waveguide input I2 would be transmitted through the switch 100 to the waveguide output O1, when neither waveguide arm 120 and 125 is heated, and to the waveguide output O2 when either of the waveguide arms 120 or 125 is heated by scanning of the regions 140 or 145 with a beam of light.

It is possible to use the thermal-optical switch configurations described in the above cited Kawachi and Haruna references in accordance with the present invention by replacing the conventional chromium heater strips with a light source heating means. It is further possible to construct a 1×1, 1×2, or 2×1 switch configuration in a substantially similar manner to the 2×2 switch shown in FIG. 3 by disconnecting the respective waveguide input I1 or I2, and/or waveguide output O1 or O2 that is/are not required. Also, it is possible to construct a multiple port switch in accordance with the present invention by connecting a plurality of switches corresponding to the switch 100 of FIG. 3 to one another. For example, a 1×8 switch can be configured using eight 1×1 switches arranged in parallel and all connected to receive a common data light signal. Such a configuration enables a single light source to operate the switch modes of each of the eight switches. Since the switches do not require heater strips or heater strip electrodes it is possible to arrange the switches substantially close to one another to form a compact 1×8 optical switch.

Figure 4:
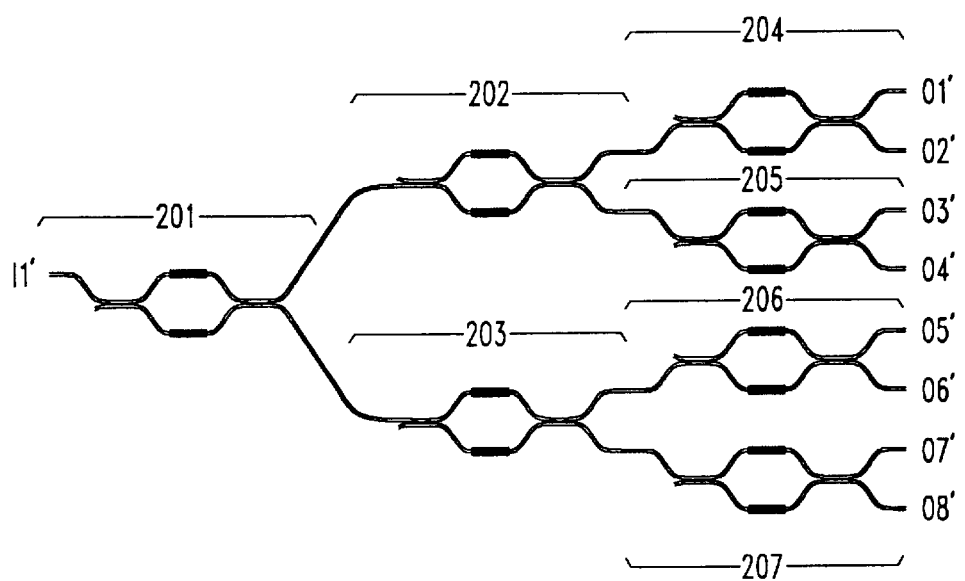
FIG. 4 is a schematic representation of a 1×8 silica optical circuit switch formed by seven cascaded circuit switches which are each substantially similar to the switch shown in FIG. 3.

FIG. 4 depicts an exemplary schematic representation of a 1×8 switch 200 in accordance with the present invention that is constructed from seven 1×2 thermally activated switches 201–207 connected in a cascaded manner. Each of the switches 201–207 are substantially similar to the switch 100 shown in FIG. 3 for illustration purposes only and it is possible to employ any thermally activated 1×2 optical switch. As in the above example, such a configuration enables a single laser heating means, such as the laser 10 and mirror structure 15, to be used to heat the corresponding waveguide arms in the switches 201–207 to produce the desired routing path from a waveguide input I1' to one of the outputs O1' to O7' of the switch 200.

Although several embodiments of the present invention have been described in detail above, many modifications can be made without departing from the teaching thereof. All of such modifications are intended to be encompassed within the following claims. For instance, it is possible to use other thermally activated switch configurations which require heating of silica glass to perform switching functions with the heating means of the present invention. The present invention is particularly useful in those circuits which require a large number of separate heated regions or a large number of switches which can be heated with a single light source.

I claim:

1. A silica optical circuit switch comprising:

a substrate;

silica glass formed on the substrate;

at least one input waveguide formed within the silica glass;

at least two output waveguides formed within the silica glass;

an intervening, normally non-waveguiding region of the silica glass interposed between the at least one input waveguide and the output waveguides;

a source of light of such wavelength that said light is substantially absorbed by the silica glass and substantially transmitted through the substrate; and an optical assembly effective for directing light from the source onto the intervening region such that optical absorptive heating will take place within said region, wherein:

the optical assembly is effective for selectively directing light onto any one of a plurality of selectable paths in the intervening region, each said path coupling an input waveguide to a selected output waveguide, such that resultant optical absorptive heating will induce a temporary waveguide that couples the input waveguide to the selected output waveguide.

2. The switch of claim 1 wherein the optical assembly comprises a mirror structure including at least one movable mirror, the mirror being moveable so as to direct the light produced by the light source to repeatedly scan at least one of the selectable paths in the silica glass.

3. The switch of claim 1 wherein the light source is a laser.

4. The switch of claim 1 wherein at least one of the selectable paths is substantially curved to substantially inhibit a portion of a light signal present in the input waveguide from entering an output waveguide that is not coupled to the input waveguide.

5. The switch of claim 1 wherein the substrate is a silicon substrate and the light source produces light having a wavelength substantially in the range of 5 to 12 $\mu$m.

6. The switch of claim 5 wherein the light source is a $CO_2$ laser.

7. The switch of claim 1 wherein the light is directed through the substrate to the silica glass.

8. The switch of claim 1 wherein the optical assembly comprises a cylindrical lens in a path of the light, wherein the cylindrical lens focuses the light.

9. A method for coupling a silica glass input waveguide to a silica glass output waveguide selected from a plurality of silica glass output waveguides, said input and output waveguides formed on a common substrate and said input waveguide separated from said output waveguides by an intervening silica glass region, the method comprising:

from a plurality of selectable paths, selecting a path across the intervening region from the input waveguide to the selected output waveguide;

selectively inducing, along the selected path, a temporary waveguide that couples the input waveguide to the selected output waveguide, wherein the inducing step comprises:

producing light of such wavelength that said light is substantially absorbed by the silica glass and substantially transmitted through the substrate; and selectively impinging said light on the intervening region along said path, such that the silica glass along said path is heated by optical absorption, thereby inducing said temporary waveguide along said path.

10. The method of claim 9 wherein the light is produced as a continuous beam of light and wherein the impinging step further comprises the step of repeatedly scanning the path with the continuous beam of light.

11. The method of claim 10 wherein the step of repeated scanning the selected light path with the beam of light further comprises:

locating a light source that generates the beam of light at a fixed position;

directing the beam of light at a mirror structure including at least one selectively moveable mirror; and repeatedly moving the mirror to redirect the beam of light to repeatedly scan the selected light path in the silica glass.

12. The method of claim 9 further comprising focusing the light with a cylindrical lens.

* * * * *